No. 807,255. PATENTED DEC. 12, 1905.
J. EVANS.
CLUTCH MECHANISM FOR COUPLING ROTATABLE PARTS.
APPLICATION FILED JAN. 30, 1905.

Witnesses
Inventor
Joseph Evans

UNITED STATES PATENT OFFICE.

JOSEPH EVANS, OF BIRMINGHAM, ENGLAND.

CLUTCH MECHANISM FOR COUPLING ROTATABLE PARTS.

No. 807,255.          Specification of Letters Patent.          Patented Dec. 12, 1905.

Application filed January 30, 1905. Serial No. 243,395.

*To all whom it may concern:*

Be it known that I, JOSEPH EVANS, a subject of the King of England, residing at Birmingham, Warwick county, England, have invented certain new and useful Improvements in Clutch Mechanism for Coupling Rotatable Parts, of which the following is a specification.

This invention relates to a governing device for clutch mechanisms used for throwing into and out of operation the driven mechanism of geared power-presses or other heavy machinery, said driven mechanism being such as to be frequently thrown into and out of operation at high speeds.

The governing device is adapted for use in connection with the clutch mechanism described and claimed in application Serial No. 185,437, filed December 16, 1903, although said governing device is applicable for any form of clutch mechanism for which it may be used.

In describing the invention in detail reference is had to the accompanying drawings, wherein like characters of reference denote corresponding parts throughout both views, and in which—

Figure 1:
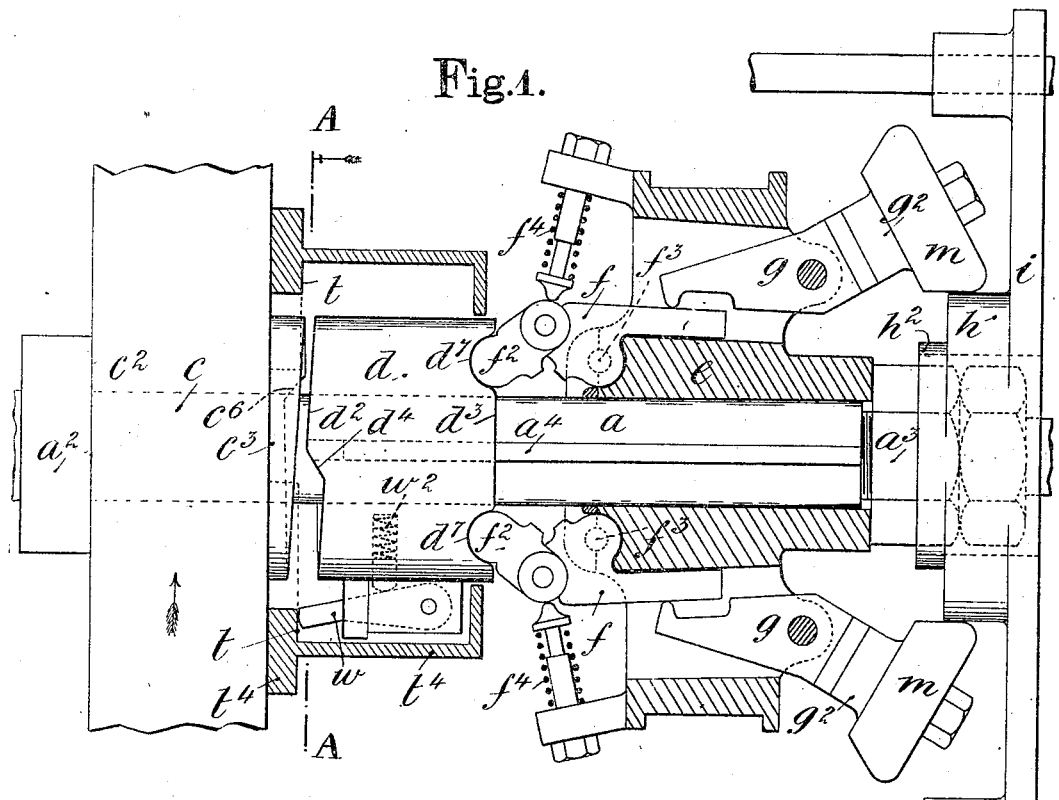
Figure 2:
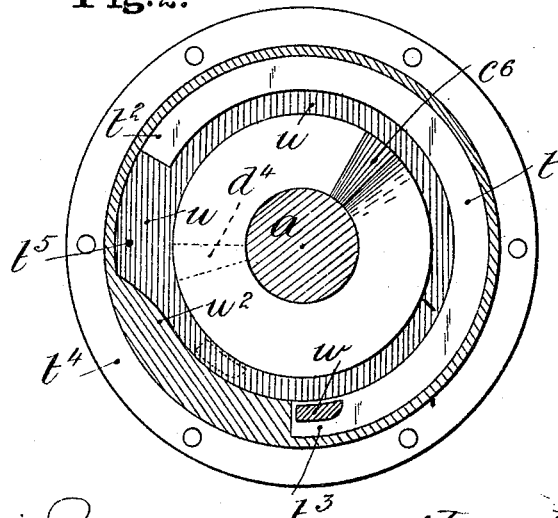

Figure 1 is a side elevation, partly in longitudinal section, of a clutch mechanism, showing a governing device constructed in accordance with this invention applied thereto. Fig. 2 is a transverse section on the line A A of Fig. 1 looking to the left.

Referring to Figs. 1 and 2 of the drawings, $a$ indicates a rotatable shaft upon which the clutch mechanism is arranged. The shaft $a$ carries axial abutments $a^2 a^3$, which are thrust-abutments. Arranged to freely rotate on the shaft $a$ is a sleeve $c$, having one end $c^2$ working against the abutment $a^2$ and its other end $c^3$ formed with an interlocking driving-incline $c^6$, extending at an angle of about sixty degrees with respect to the axis of the shaft. The sleeve $c$ also carries a part of the governing device which will be hereinafter referred to.

Mounted upon the shaft $a$ is an axially-slidable collar $d$, which rotates at all times with said shaft $a$ and is adapted to engage and disengage the end $c^3$ of the sleeve $c$. The said collar $d$ has its end $d^2$ adjacent to the sleeve $c$ formed with a counterpart of the interlocking driving-incline $c^6$, this counterpart being represented at $d^4$. When the two driving-inclines are in engagement with each other, the sleeve $c$ rotates with the shaft $a$; but when the driving-inclines are separated the sleeve $c$ does not rotate with the shaft $e$. The collar $d$ is caused to rotate with the shaft $a$ by means of the key $a^4$; but, as before stated, said collar $d$ is axially slidable upon the shaft $a$ for the purpose of causing the engagement and disengagement of the incline $d^4$ with the incline $c^6$. The sleeve $c$ is the driving element of the mechanism, and the shaft $a$ is the driven element, and in order that the sleeve $c$ may drive the shaft $a$ the collar $d$ must be held with its driving-incline in close inseparable engagement with the driving-incline of the sleeve $c$, the natural action of the inclines being to separate the sleeve from the collar $d$.

To move the collar $d$ and hold it in driving engagement with the sleeve $c$, the following parts are provided on the shaft $a$ on the right-hand side of the said collar $d$. A carrier-sleeve $e$ is fixed on the shaft $a$ and rotates with it through the medium of the key $a^4$. The sleeve $e$ has one of its ends working against the thrust-abutments $a^3$. Two bell-crank levers $f f$ are carried by the sleeve $e$, each having pivotally connected to it a short block $f^2$. These blocks have one of their ends engaging against the end $d^3$ of the sliding collar $d$. Recesses $d^7$ are formed in the collar $d$ to receive the ends of the blocks $f^2$. The fulcrum of each of the levers $f$ is in the carrier-sleeve $e$, as indicated at $f^3$. Springs $f^4$ are carried by the sleeve $e$ and bear upon the levers $f$, so as to automatically rock them out of the position shown in Fig. 1, the springs $f^4$ being applied to levers $f$ at the point where the blocks $f^2$ are pivotally connected to the levers $f$. One arm of each of the levers $f$ is engaged by one of the arms of a second lever $g$, fulcrumed on the sleeve $e$, and the other arm on each of the levers $g$ is adapted to engage a collar $h$, which is moved by a frame $i$, so as to rock the said lever $g$ into the position as shown in Fig. 1, the ends $g^2$ of the levers $g$ at this time resting upon the periphery of the collar $h$, which is concentric with the shaft $a$. The ends $g^2$ of the second levers $g$ are provided with rollers $m$ for contacting the collar $h$. A cam-lead $h^2$ is provided as a part of the collar $h$ to lift the ends $g^2$ of the second levers onto the said collar. The collar $h$ does not rotate, but slides along the axis of the shaft $a$.

The foregoing parts constitute a clutch mechanism which is fully set forth in application Serial No. 185,437, filed December 16, 1903, and is shown and described, so that the operation of the governing device hereinafter referred to can be clearly understood.

The governing device is adapted to throw into driving engagement the inclines $c^6$ $d^4$ at the proper time. A form of governing device is shown in Figs. 1 and 2 in connection with the parts hereinbefore referred to.

Normally the tendency of the sleeve $c$ and collar $d$ is to be engaged by the action of the springs $f^4$ at the time the ends $g^2$ of the levers $g$ are clear of the collar $h$, and this action should be avoided, as otherwise the engagement between the driving-inclines would be at the wrong time. So, therefore, to cause the engagement of the driving-inclines at the proper time the governing device is employed and will now be described.

The slidable collar $d$ carries a pivoted finger or stop-piece $w$, working against an offset carried by the sleeve $c$, the contour of the offset being concentric and is arranged concentric with the shaft $a$ for about two-thirds of its diameter. The offset is clearly shown in Fig. 2 and is indicated by the reference characters $t$ $t^2$ $t^3$, it being what may be termed a "one-level" plane. Between the ends of the offset, which are indicated by the reference characters $t^2$ $t^3$, a gap or sinking $u$ and a cam-piece $u^2$ are provided, these being carried by the piece $t^4$, upon which the offset is formed, the piece $t^4$ being carried by the sleeve $c$. The finger or stop-piece $w$ has its free end forced away from the collar $d$ through the medium of a spring $w^2$, carried by said collar $d$. This action causes the free end of the finger or stop-piece $w$ to be positioned in the path of the offset as well as engage the offset, and as long as the finger $w$ engages the offset the slidable collar $d$ cannot be forced into engagement with the sleeve $c$, the said engagement being only possible while the stop-piece $w$ is opposite the gap or recess $u$, which is extended, as shown in Fig. 2, into a ring-like cut-away part of the same depth as the said gap.

The operation of the governing device is as follows: The sleeve $c$ is continuously rotating in the direction of the arrows, while the collar $d$ is normally stationary, the springs $f^4$ for forcing the said collar $d$ into engagement with the sleeve $c$ being held out of action. At this time as the sleeve rotates the end of the finger $w$ contacting the offset is at each rotation of the said sleeve $c$ pulled inwardly off the said offset into the recess $u$ by the action of the cam-piece $u^2$. Immediately it is free of the cam-piece it is caused to move back and onto the offset through the action of the spring $w^2$. Now immediately the springs $f^4$ are brought into action by hand operation to push the collar $d$ toward the sleeve $c$ there is an automatic effort of the parts $c$ and $d$ to engage; but this engagement is not possible until the finger $w$ has by the cam-piece $u^2$ been moved opposite the gap $u$, when at once the collar $d$ can move into engagement with the sleeve, so that the driving-inclines $c^6$ $d^4$ can come together with a full and complete engagement. The gap $u$ and the cam-piece $u^2$ are the parts which operate to permit the engagement of the collar $d$ and sleeve $c$, and as these parts are only a portion of a circle it will be quite clear that the period of time for the engagement of the clutch is from the point $t^2$ (in the direction of the point $t^5$) to the point $t^3$, and as these parts $u$ $u^2$, together with the finger $w$, are arranged in a predetermined position with respect of the driving-inclines $c^6$ $d^4$ a result is obtained which insures the collar $d$ and sleeve $c$ going into engagement with each other, so that instantly the driving-inclines $c^6$ $d^4$ touch for driving they are always in full and complete engagement. In a word, the governing device provides that the driving and driven parts of the clutch can only be connected at the right moment for a full and proper engagement.

Having thus fully described my invention, what I claim as new, and desire to secure by Letters Patent, is—

1. A governing device for clutch mechanisms, comprising the combination with a driving and a driven element adapted to interlock one with the other, of locking means carried by one of said elements and engaging the other of said elements for preventing the operation of the driven element by the driving element until said elements are in position to interlock, and means provided on the other of said elements and adapted to release said locking means to permit of the interlocking of the said element so that the two elements can be operated together.

2. A governing device for clutch mechanisms, comprising the combination with a driving element provided with an offset, a cam-piece and a gap, of a driven element, a clutch member carried thereby and adapted to be moved into locking engagement with the driven element for clutching the two elements together causing thereby their operation in unison, and means carried by said clutch member to prevent the interlocking of said member with the driven element until the said member and driven element are in proper position to interlock, said means operating upon said offset, in said gap and directly off said offset into said gap by said cam-piece.

3. In a governing device for clutch mechanisms, the combination with a driving element and a driven element, of a clutch member carried by the driven element and adapted to interlock with the driving element for coupling said elements together, and means carried by the clutch member for preventing the interlocking thereof with the driving element until the said driving element and member are in proper position, said means when said driving element and clutch member are in proper position to interlock adapted to engage in the driving element to permit of the interlocking of the driving element and said clutch member so that the two elements will operate in unison.

In testimony whereof I have hereunto set my hand in presence of two subscribing witnesses.

JOSEPH EVANS.

Witnesses:
GEORGE FUERST,
H. DAVIS.